United States Patent

Mizuguchi et al.

[11] Patent Number: 5,808,094
[45] Date of Patent: Sep. 15, 1998

[54] PREPARATION OF MIXED CRYSTALS AND SOLID SOLUTIONS OF 1,4-DIKETOPYRROLOPYRROLES

[75] Inventors: Jin Mizuguchi, Yokohama, Japan; Zhimin Hao; Olof Wallquist, both of Marly, Switzerland; Abul Iqbal, Arconciel, Switzerland

[73] Assignee: Ciba Specialty Chemicals Corporation, Tarrytown, N.Y.

[21] Appl. No.: 898,140

[22] Filed: Jul. 22, 1997

Related U.S. Application Data

[62] Division of Ser. No. 712,721, Sep. 12, 1996, Pat. No. 5,693,824.

[30] Foreign Application Priority Data

Sep. 20, 1995 [CH] Switzerland .............. 2651/95

[51] Int. Cl.$^6$ .............. C07D 487/04; C07D 209/02; C07D 405/14; C07D 409/14
[52] U.S. Cl. .............. 548/453; 548/454; 548/465; 548/466; 548/467; 548/515; 544/242; 544/333; 544/335; 546/251; 546/276.7; 546/278.4; 549/1; 549/29; 549/59; 549/74; 549/78; 549/200; 549/491; 549/497; 106/287.21; 106/401; 106/496; 106/498
[58] Field of Search .............. 548/453, 454, 548/465, 512, 515; 106/287.21, 401, 496, 498

[56] References Cited

U.S. PATENT DOCUMENTS 5,565,578 10/1996 Bäbler .............. 548/453

*Primary Examiner*—Johann Richter
*Assistant Examiner*—Jane C. Osweeki
*Attorney, Agent, or Firm*—Kevin T. Mansfield

[57] ABSTRACT

A process for the preparation of mixed crystals of 1,4-diketopyrrolo[3,4-c]pyrroles, consisting of 1 mol each of two different compounds of formula

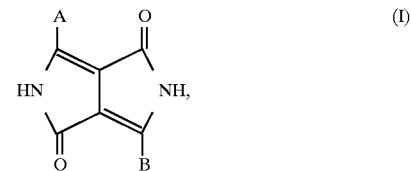

(I)

by heating a corresponding mixture in solid form to the temperature range from 220° to 380° C.

A and B are, for example, each a group of formula

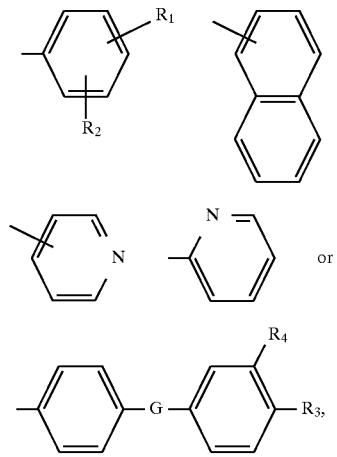

wherein
R$_1$ and R$_2$ are each independently hydrogen, chloro, bromo, C$_1$–C$_4$alkyl, C$_1$–C$_6$alkoxy, C$_1$–C$_6$alkylamino, phenyl or —CN,
G is —O—, —NR$_7$—, —N=N— or —SO$_2$—,
R$_3$ and R$_4$ are hydrogen, and R$_7$ is hydrogen, methyl or ethyl.

The mixed crystals and solid solutions obtained are excellently suited for pigmenting high molecular weight material.

11 Claims, No Drawings

PREPARATION OF MIXED CRYSTALS AND SOLID SOLUTIONS OF 1,4-DIKETOPYRROLOPYRROLES

This application is a division of Ser. No. 08/712,721 filed Sep. 12, 1996, now U.S. Pat. No. 5,693,824.

The present invention relates to the preparation of mixed crystals and solid solutions from two different symmetrical 1,4-diketopyrrolopyrroles by heating a corresponding mixture to elevated temperatures.

U.S. Pat. No. 4,783,540 discloses that solid solutions can be obtained by mixing two different 1,4-diketopyrrolopyrroles, preferably in a ratio of 65–90:35–10% by weight, and by subsequently treating them by

- contacting in polar organic solvents, preferably by stirring the component mixture at reflux temperature,
- alkaline precipitation of the component mixture in polar organic solvents or by stirring the component mixture in polar organic solvents in the presence of alkali metal alcoholates, alkali metal hydroxides or quaternary ammonium compounds,
- acid precipitation, i.e. by dissolving the component mixture in acid and precipitating the solid solution by dilution with water, or
- intensely grinding or kneading the component mixture, where required with subsequent recrystallisation in water and/or organic solvents.

These solid solutions are characterised by their X-ray diffraction pattern, and the X-ray diffraction patterns of the solid solutions differ from the sum of the X-ray diffraction patterns of the individual components.

It has now been found that simple heating of a mixture of two different 1,4-diketopyrrolopyrroles in solid form results entirely surprisingly in mixed crystals or solid solutions.

To prevent misunderstandings regarding the definition of solid solutions and mixed crystals, it will be noted here that, depending on the structure and mixture ratio of the components, it is possible to obtain two types of products by the process of this invention:

- Solid solutions of the "host-guest" type, wherein the "guest" component lodges in the crystal lattice of the "host". The X-ray diffraction pattern of such solid solutions contains the lines of the "host" component. If no lines of the "guest" component appear in the X-ray diffraction pattern, then the product is crystallographically pure, i.e. it is a single phase solid solution;
- mixed crystals in which a completely new crystal lattice is formed. The X-ray diffraction pattern of said mixed crystal differs from the X-ray diffraction patterns of the individual components.

Accordingly, the invention relates to a process for the preparation of mixed crystals or solid solutions of 1,4-diketopyrrolo[3,4-c]pyrroles, consisting of two different compounds of formula

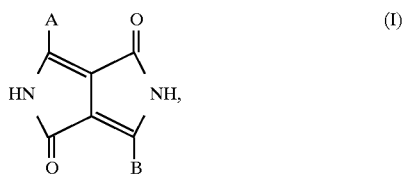

(I)

wherein A and B are each independently of the other a group of formula

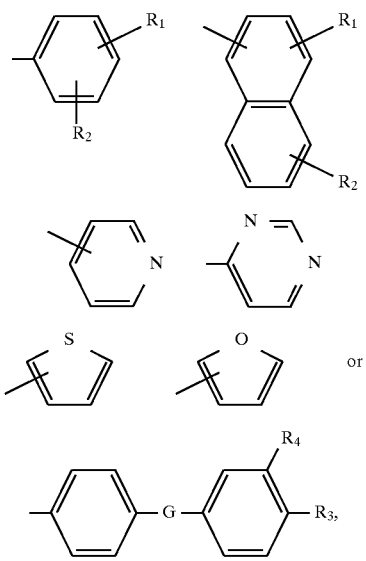

wherein
$R_1$ and $R_2$ are each independently of the other hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_2$–$C_{18}$alkoxycarbonyl, $C_2$–$C_{18}$alkylaminocarbonyl, —CN, —NO$_2$, phenyl, trifluoromethyl, $C_5$–$C_6$cycloalkyl, —C≡N—($C_1$–$C_{18}$alkyl),

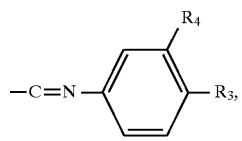

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —CH$_2$—, —CH(CH$_3$)—, —C(CH$_3$)$_2$—, —CH=N—, —N=N—, —O—, —S—, —SO—, —SO$_2$—, —CONH— or —NR$_7$—, R$_3$ and R$_4$ are each independently of the other hydrogen, halogen, $C_1$–$C_6$alkyl, $C_1$–$C_{18}$alkoxy or —CN, R$_5$ and R$_6$ are each independently of the other hydrogen, halogen or $C_1$–$C_6$alkyl, and R$_7$ is hydrogen or $C_1$–$C_6$alkyl, which process comprises heating a mixture of two different compounds of formula I in solid form to the temperature range from 220° to 380° C., preferably from 240° to 360° C. and, most preferably, from 270° to 340° C.

Substituents defined as halogen are typically iodo, fluoro, preferably bromo and, most preferably, chloro;

$C_1$–$C_6$alkyl is typically methyl, ethyl, n-propyl, isopropyl, n-butyl, sec-butyl, tert-butyl, n-amyl, tert-amyl, hexyl, and $C_1$–$C_{18}$alkyl is in addition typically heptyl, octyl, 2-ethylhexyl, nonyl, decyl, dodecyl, tetradecyl, hexadecyl or octadecyl;

$C_1$–$C_{18}$alkoxy is, also in $C_2$–$C_{18}$alkoxycarbonyl, typically methoxy, ethoxy, n-propoxy, isopropoxy, butoxy, hexyloxy, decyloxy, dodecyloxy, hexadecyloxy or octadecyloxy;

$C_1$–$C_{18}$alkylmercapto is, for example, methylmercapto, ethylmercapto, propylmercapto, butylmercapto, octylmercapto, decylmercapto, hexadecylmercapto or octadecylmercapto;

$C_1$–$C_{18}$alkylamino is, also in $C_2$–$C_{18}$alkylaminocarbonyl, typically methylamino, ethylamino, propylamino, hexylamino, decylamino, hexadecylamino or octadecylamino.

$C_5$–$C_6$Cycloalkyl is typically cyclopentyl and, preferably, cyclohexyl.

The process of this invention is of particular interest for the preparation of mixed crystals wherein A and B in formula I are each independently of the other a group of formula

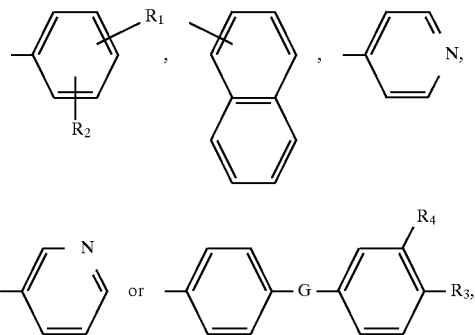

wherein
$R_1$ and $R_2$ are each independently of the other hydrogen, chloro, bromo, $C_1$–$C_4$alkyl, $C_1$–$C_6$alkoxy, $C_1$–$C_6$alkylamino, CN or phenyl,
G is —O—, —$NR_7$—, —N=N— or —$SO_2$—,
$R_3$ and $R_4$ are hydrogen, and $R_7$ is hydrogen, methyl or ethyl,
and more particularly for the preparation of those mixed crystals, wherein A and B in formula I are each a group of formula

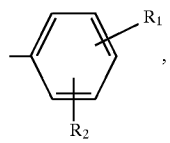

wherein $R_1$ and $R_2$ are each independently of the other hydrogen, methyl, tert-butyl, chloro, bromo, phenyl or CN. $R_2$ is preferably hydrogen.

The two different components of formula I are usefully present in a molar ratio from 50–95% to 50–5%, preferably from 50–60% to 50–40%, resulting in mixed crystals or solid solutions having interesting changes in shade in comparison with the starting products.

One of the two components can itself be a mixture of two different compounds of formula I.

The preparation of mixed crystals of this invention is conveniently carried out by intimately mixing the different components of formula I defined above by commonly known methods and by
 heating the component mixture to the required temperature mentioned above, e.g. in an oven, or
 sublimating the component mixture in a sublimation apparatus (as described, inter alia, in J. Mizuguchi, Crystal Research and Technology, 16, 695–700 (1981)).

In the latter case, the pure mixed crystals form during condensation from the vapour phase. Care must be taken, however, that a high temperature, slightly lower than the sublimation point of the starting substances, is kept constant over a long condensation zone. This long condensation zone allows to separate the mixed crystals from unreacted starting material which condenses at lower temperatures than the mixed crystals.

Another embodiment of this invention comprises coating the two different components by evaporation singly in two or more alternate thin layers under high vacuum on a suitable substrate (e.g. glass or heat-resistant polymers) and then coating them with a photopolymer protective layer (e.g. UV-crosslinkable acrylate-based varnish ®DAICURE CLEAR SD-17 (DIC GmbH); UV-hardening varnish based on acrylate ®RENGOLUX Rz 3203/001 colourless (Dr. Renger GmbH)) and subsequently irradiating them with laser, e.g. using $Ar^+$ laser ($\lambda$=514 nm).

The mixed crystals form in the solid state.

The latter method is excellently suited for use in optical recording processes.

To ease the mixing of the two components, a mixing assistant can be added, typically NaCl or, preferably, NaF. The mixing assistant is usefully added in amounts of 0 to 20, preferably of 0.5 to 2% by weight, based on the component mixture.

In order to optimise the pigment properties, it may be expedient to subject the pigments to aftertreatment. The recrystallisation or thermal treatment is carried out by conventional methods for pigments. The usual method is that of thermal aftertreatment in water or in an organic solvent and under normal or elevated pressure. It is preferred to use organic solvents, typically benzenes which are substituted by halogen atoms, alkyl groups or nitro groups such as xylenes, chlorobenzene, o-dichlorobenzene or nitrobenzene, as well as pyridine bases, typically pyridine, picoline or quinoline, and also ketones such as cyclohexanone, alcohols such as isopropanol, butanols or pentanols, ethers such as 2-methoxyethanol or 2-ethoxyethanol, amides such as dimethylformamide or N-methylpyrrolidone, as well as dimethyl sulfoxide or sulfolane. The aftertreatment may also be carried out in water, under normal or elevated pressure, in the presence of organic solvents and/or with the addition of surfactants.

It is possible to use the mixed crystals as well as the solid solutions of the process of this invention as pigments for dyeing high molecular weight organic material.

Illustrative examples of high molecular weight organic materials which can be coloured with the novel mixed crystals or solid solutions are cellulose ethers and esters, typically ethyl cellulose, nitro cellulose, cellulose acetate, cellulose butyrate, natural resins or synthetic resins, typically polymerisation or condensation resins, such as aminoplasts, preferably urea/formaldehyde and melamine/formaldehyde resins, alkyd resins, phenolic plastics, polycarbonates, polyolefins, polystyrene, polyvinyl chloride, polyamides, polyurethanes, polyester, ABS, polyphenylene oxides, rubber, casein, silicone and silicone resins, singly or in mixtures.

The above high molecular weight organic compounds may be obtained singly or as mixtures as plastics, melts or in the form of spinning solutions, paints, coating materials or printing inks. Depending on the end use requirement, it is expedient to use the mixed crystals or solid solutions of this invention as toners or in the form of preparations.

The mixed crystals or solid solutions of this invention can be used in an amount of 0.01 to 30% by weight, preferably of 0.1 to 10% by weight, based on the high molecular weight organic material to be pigmented.

The pigmenting of the high molecular weight organic materials with the mixed crystals or solid solutions of this invention is conveniently effected by incorporating such mixed crystals or solid solutions by themselves or in the form of masterbatches in the substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated into the novel mixed crystals or solid solutions before or after working the pigments into the polymers. To obtain different shades, it is also possible to add to the high molecular weight organic materials fillers or other chromophoric components such as white, coloured or black pigments in any amount, in addition to the novel mixed crystals or solid solutions.

For pigmenting paints, coating materials and printing inks, the high molecular weight organic materials and the mixed crystals or solid solutions of this invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The novel mixed crystals and solid solutions are particularly suitable for colouring plastics, more particularly polyvinyl chloride and polyolefins, and paints, preferably automotive lacquers.

However, mixed crystals or solid solutions can also be formed in the polymer itself by incorporating the two pyrrolopyrrole components singly into the polymer and by heating the mixture to the suitable temperature. Accordingly, another embodiment of the invention comprises dispersing two different compounds of formula I together with a polymer in an extruder in the temperature range from 160° to 210° C. and then moulding them in the temperature range from 220° to 300° C. Plastic mouldings are thus obtained which are coloured with the mixed crystals (or solid solutions) formed in the extruder. The formation of mixed crystals usually takes place in the polymer in the temperature range of at least 220° to 300° C.

Polymers suitable for this purpose are, for example, polycarbonates, polyolefins, polystyrene, polyamides, polyesters, ABS or polyphenylene oxides.

When used for colouring e.g. polyvinyl chloride or polyolefins, the novel mixed crystals as well as the novel solid solutions have good allround pigment properties, such as good dispersibility, superior colour strength and purity, good fastness to migration, heat, light and weathering as well as good hiding power.

The following Examples illustrate the invention in more detail.

EXAMPLE 1

2.36 g (6.6 mmol) of the pyrrolopyrrole of formula

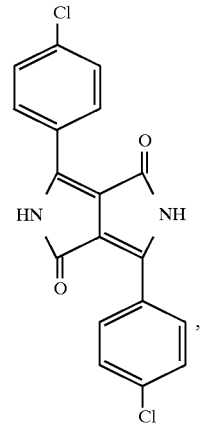

(II)

2.09 g (6.6 mmol) of the pyrrolopyrrole of formula

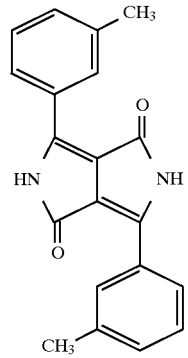

(III)

and 40 mg of sodium fluoride are intimately mixed in a mortar. The powdered mixture so obtained is placed in a porcelain dish with a closed lid and heated in an oven to 300° C. for 4 hours, giving a red powdered product in quantitative yield which is thoroughly washed with water and then dried in a vacuum drying oven at 80° C.

| Analysis: | C | H | N | Cl |
|---|---|---|---|---|
| calcd.: | 67.76% | 3.89% | 8.32% | 10.53% |
| found: | 67.19% | 3.86% | 8.27% | 10.51% |

The X-ray diffraction pattern is characterised by the following diffraction lines:

| Interplanar spacings (d-values in Å) | Scattering angles (2Θ) | Relative intensity |
|---|---|---|
| 15.1550 | 5.83 | 100 |
| 6.8411 | 12.93 | 29 |
| 6.4135 | 13.80 | 24 |
| 6.0442 | 14.64 | 41 |
| 5.0401 | 17.58 | 18 |
| 3.7190 | 23.91 | 24 |
| 3.6148 | 24.61 | 14 |
| 3.3203 | 26.83 | 86 |
| 3.1550 | 28.26 | 27 |
| 2.8766 | 31.06 | 14 |
| 2.7846 | 32.12 | 9 |

EXAMPLE 2

0.9 g (2.5 mmol) of the pyrrolopyrrole of formula II (see Example 1), 1.0 g (2.2 mmol) of the pyrrolopyrrole of formula

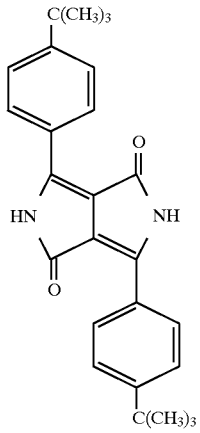

(IV)

and 10 mg of sodium fluoride are intimately mixed in a mortar. The powdered mixture so obtained is placed in a porcelain dish with a closed lid and heated in an oven to 270° C. for 1 hour, giving a bluish red powdered product in quantitative yield which is thoroughly washed with water and then dried in a vacuum drying oven at 80° C.

| Analysis: | C | H | N | Cl |
|---|---|---|---|---|
| calcd.: | 69.25% | 4.94% | 7.42% | 9.93% |
| found: | 69.15% | 5.10% | 7.23% | 9.54% |

The X-ray diffraction pattern is characterised by the following diffraction lines:

| Interplanar spacings (d-values in Å) | Scattering angles (2Θ) | Relative intensity |
|---|---|---|
| 19.4419 | 4.54 | 100 |
| 9.5816 | 9.22 | 8 |
| 6.3592 | 13.52 | 23 |
| 4.9987 | 17.73 | 64 |
| 4.8998 | 18.09 | 37 |
| 3.7966 | 23.41 | 9 |
| 3.6459 | 24.40 | 10 |
| 3.3709 | 26.42 | 56 |
| 3.2363 | 27.54 | 18 |
| 3.1617 | 28.20 | 11 |
| 3.0412 | 29.34 | 10 |

EXAMPLE 3

5.36 g (15 mmol) of the pyrrolopyrrole of formula II (see Example 1) and 4.01 g (10 mmol) of the pyrrolopyrrole of formula IV (see Example 2) are intimately mixed in a mortar. The powdered mixture so obtained is placed in a porcelain dish with a closed lid and heated in an oven to 300° C. for 4 hours, giving a bluish red powdered product in quantitative yield.

| Analysis: | C | H | N | Cl |
|---|---|---|---|---|
| calcd.: | 67.51% | 4.51% | 7.51% | 11.91% |
| found: | 67.53% | 4.62% | 7.24% | 11.31% |

The X-ray diffraction pattern is characterised by the following diffraction lines:

| Interplanar spacings (d-values in Å) | Scattering angles (2Θ) | Relative intensity |
|---|---|---|
| 19.1018 | 4.62 | 100 |
| 15.8733 | 5.56 | 8 |
| 6.3224 | 14.00 | 20 |
| 4.9820 | 17.79 | 42 |
| 4.8891 | 18.13 | 27 |
| 3.7810 | 23.51 | 9 |
| 3.6309 | 24.50 | 9 |
| 3.4538 | 25.77 | 9 |
| 3.3589 | 26.52 | 39 |
| 3.2236 | 27.65 | 14 |
| 3.1532 | 29.34 | 18 |
| 3.0371 | 29.39 | 8 |

EXAMPLE 4

7.5 g of the mixed crystal of Example 1, 98.9 g of a CAB solution consisting of
  41.0 g of cellulose acetobutyrate (CAB 531.1, 20% in butanol/xylene 2:1 (Eastman Chem.)
  1.5 g of zirconium octoate,
  18.5 g of ®SOLVESSO 150 (SOLVESSO: aromatic hydrocarbons; ESSO),
  21.5 g of butyl acetate, and
  17.5 g of xylene,
36.5 g of polyester resin ®DYNAPOL H700 (Dynamit Nobel), 4.6 g of melamine resin MAPRENAL MF650 (Hoechst) and 2.5 g of dispersant ®DISPERBYK160 (Byk Chemie) are dispersed together over 90 minutes in a disperser (total varnish: 150 g; 5% of pigment). For the base coat layer, 27.69 g of the mass-tone varnish so obtained are mixed with 17.31 g of Al stock solution (8%) consisting of
  12.65 g of ®SILBERLINE SS 3334AR, 60% (Silberline Ltd.)
  56.33 g of CAB solution (composition as above)
  20.81 g of polyester resin ®DYNAPOL H700
  2.60 g of melamine resin ®MAPRENAL MF650
  7.59 g of ®SOLVESSO 150
and sprayed onto an aluminium sheet (wet film c. 20 μm). After drying in the air for 30 minutes at room temperature, a TSA varnish consisting of
  29.60 g of acrylic resin ®URACRON 2263 XB, 50% in xylene/butanol (Chem. Fabrik Schweizerhalle),
  5.80 g of melamine resin ®CYMEL 327, 90% in isobutanol,
  2.75 g of butyl glycol acetate,
  5.70 g of xylene,
  1.65 g of n-butanol
  0.50 g of silicone oil, 1% in xylene,
  3.00 g of light stabiliser ®TINUVIN 900, 10% in xylene (Ciba)
  1.00 g of light stabiliser ®TINUVIN 292, 10% in xylene (Ciba)
is sprayed thereon as top coat finish (wet film c. 50 μm). After drying in the air for a further 30 minutes at room temperature, the varnish is stoved for 30 minutes at 130° C.

EXAMPLE 5

0.6 g of the mixed crystal of Example 1 is mixed with 67 g of polyvinyl chloride, 33 g of dioctylphthalate, 2 g of dibutyl tin dilaurate and 2 g of titanium dioxide and processed on a roll mill for 15 minutes at 160° C. to a thin film. The PVC film so obtained has superior colour strength and is resistant to migration and light.

EXAMPLE 6

1000 g of polypropylene granulate (®DAPLEN PT-55, Chemie LINZ) and 20 g of a 50% pigment preparation, consisting of 10 g of the solid solution of Example 3 and 10 g of magnesium behenate, are thoroughly mixed in a mixer drum. The granulate so treated is then spun according to the melt spinning process in the temperature range from 260° to 285° C. Red filaments are obtained having excellent light and textile fastness properties.

EXAMPLE 7

0.5 g (1.7 mmol) of the pyrrolopyrrole of formula

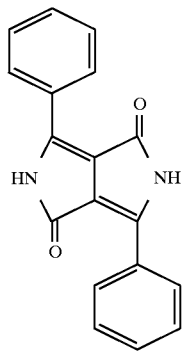

(V)

and 0.7 g (1.7 mmol) of the pyrrolopyrrole of formula IV (see Example 2) are intimately mixed and placed in an evaporation boat consisting of tantalum. This boat is then introduced into a sublimation tube which is then evacuated with a rotary-vane pump equipped with cold traps. Subsequently, argon carrier gas is introduced into the sublimation tube at an argon flow rate of 0.15 ml/min and the sublimation is carried out at 340° C. over 24 hours. A dark red substance condenses in the temperature zone of 310° C. in the form of a crystalline powder (1.08 g, 90% of theory). According to spectroscopic and crystallographic analysis, the product is virtually identical with the product of Example 1. The unreacted starting products condense in a lower temperature zone and can thus easily be separated.

EXAMPLE 8

A vacuum evaporation apparatus, equipped with two evaporation boats which can be controlled independently, is used for the preparation of multilayers. A first thin layer of the pyrrolopyrrole of formula V (see Example 7) (150 Å) and a second layer of the pyrrolopyrrole of formula IV (see Example 2) (also 150 Å) are coated by evaporation successively under high vacuum on a glass plate, both products being used in a molar ratio of 1:1. The procedure is repeated three times, each time under vacuum, so that four pairs of layers are alternately coated by evaporation on the glass plate. Subsequently, a protective layer (layer thickness about 10 μm) consisting of a UV-crosslinkable acrylate-based varnish (®DAICURE CLEAR SD-17; DIC GmbH) is then coated thereon and crosslinked with UV light. The glass plate coated in this manner is then irradiated with Ar$^+$ laser ($\lambda$=514 nm; 400 mW) at a scanning rate of 100 mm/sec. The irradiation results in an immediate change in shade from red to dark red. The absorption spectrum having two peaks at 494 and 576 nm substantially corresponds to that of the mixed crystal of Example 1.

This multilayer system is excellently suitabed for use in write-once optical disks.

EXAMPLE 9

A mixture of 0.5 g of the pyrrolopyrrole of formula IV (see Example 2) and 0.5 g of the pyrrolopyrrole of formula V (see Example 7), 1.0 g of antioxidant (®IRGANOX) 1010, CIBA-GEIGY AG) and 1000 g of polyethylene-HD granulate (®VESTOLEN 60-16, HUELS) is premixed for 15 minutes in a glass flask on a roller gear table. The mixture is then extruded in two passes in a single screw extruder in the temperature range from 160° to 200° C. The granulate so obtained is moulded to plates in an injection moulding machine (®FERROMATIK AARBURG 200) for 5 minutes at 240° C.

Dark red plates are obtained, the colour of which is the same as that of the polyethylene plate coloured with the corresponding mixed crystal.

EXAMPLE 10

The procedure of Example 9 is repeated, but replacing the pyrrolopyrrole of formula V with the same amount of the pyrrolopyrrole of formula II (see Example 1). Dark red plates are obtained, the colour of which corresponds exactly to that of the polyethylene plate coloured with the corresponding mixed crystal.

EXAMPLE 11

The procedure of Example 9 is repeated, but replacing the pyrrolopyrrole of formula IV with the same amount of the pyrrrolopyrrole of formula II (see Example 1), and replacing the pyrrolopyrrole of formula V with the same amount of the pyrrolopyrrole of formula

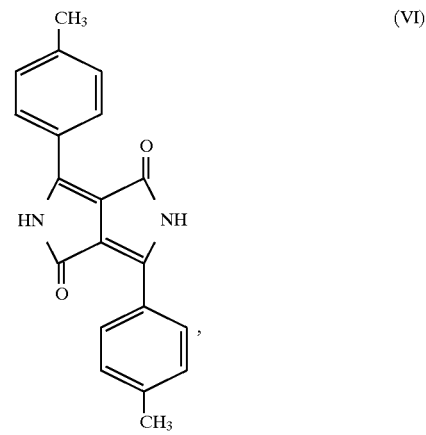

(VI)

and injection moulding is carried out at 280° C. Red plates are obtained, the colour of which is the same as that of the plate coloured with the corresponding mixed crystal.

EXAMPLE 12

The procedure of Example 9 is repeated, but replacing the pyrrolopyrrole of formula IV with the pyrrolopyrrole of formula III (see Example 1) and replacing the pyrrolopyrrole of formula V with the pyrrolopyrrole of formula

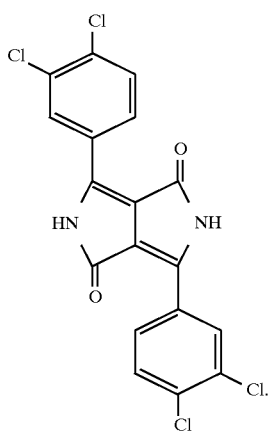 (VII)

Pale red plates are obtained, the colour of which corresponds to that of the plates coloured with the corresponding mixed crystal.

What is claimed is:

1. A process for the preparation of mixed crystals or solid solutions of 1,4-diketopyrrolo[3,4-c]pyrroles consisting of two different compounds of the formula

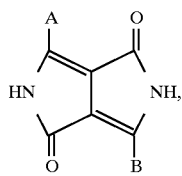 (I)

wherein A and B are each independently of the other a group of the formula

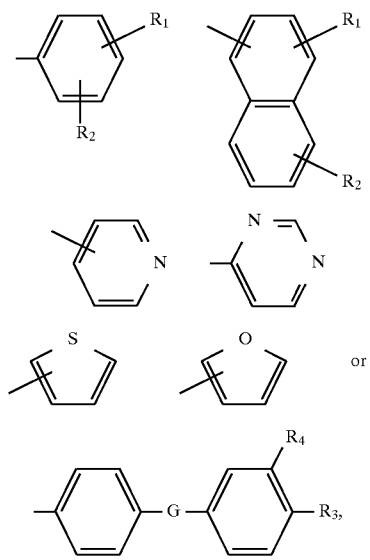

wherein $R_1$ and $R_2$ are each independently of the other hydrogen, halogen, $C_1$–$C_{18}$alkyl, $C_1$–$C_{18}$alkoxy, $C_1$–$C_{18}$alkylmercapto, $C_1$–$C_{18}$alkylamino, $C_2$–$C_{18}$alkoxycarbonyl, $C_2$–$C_{18}$alkylaminocarbonyl, —CN, —$NO_2$, phenyl, trifluoromethyl, $C_5$–$C_6$cycloalkyl, —C=N—($C_1$–$C_{18}$alkyl),

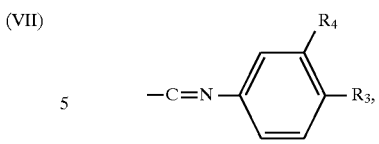

imidazolyl, pyrrazolyl, triazolyl, piperazinyl, pyrrolyl, oxazolyl, benzoxazolyl, benzothiazolyl, benzimidazolyl, morpholinyl, piperidinyl or pyrrolidinyl, G is —$CH_2$—, —$CH(CH_3)$—, —$C(CH_3)_2$—, —CH=N—, —N=N—, —O—, —S—, —SO—, —$SO_2$—, —CONH— or —$NR_7$—, $R_3$ and $R_4$ are each independently of the other hydrogen, halogen, $C_1$–$C_6$alkyl, $C_1$–$C_{18}$alkoxy or —CN, $R_5$ and $R_6$ are each independently of the other hydrogen, halogen or $C_1$–$C_6$alkyl, and $R_7$ is hydrogen or $C_1$–$C_6$alkyl, which process comprises coating the different compounds of formula I by evaporation singly in two or more alternate thin layers under high vacuum on a suitable substrate, coating them with a photopolymer protective layer and subsequently irradiating them with a laser to heat the layers of the two different compounds of formula I in solid form to a temperature in the range of from 220° to 380° C., or dispersing two different compounds of formula I together with a polymer in an extruder in the temperature range from 160° to 210° C. and then moulding them to mouldings in the temperature range from 220° to 300° C.

2. A process according to claim 1, which comprises coating the different compounds of formula I by evaporation singly in two or more alternate thin layers under high vacuum on a suitable substrate, coating them with a photopolymer protective layer and subsequently irradiating them with a laser to heat the layers of the two different compounds of formula I in solid form to a temperature in the range of from 220° to 380° C.

3. A process according to claim 2, wherein A and B in formula I are each independently of the other a group of the formula

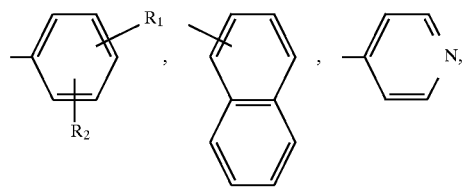

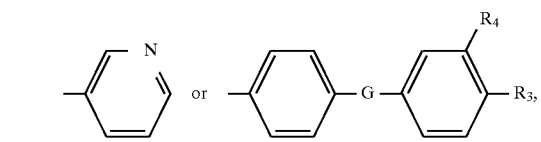

wherein $R_1$ and $R_2$ are each independently of the other hydrogen, chloro, bromo, $C_1$–$C_4$alkyl, $C_1$–$C_6$alkoxy, $C_1$–$C_6$alkylamino, phenyl or CN, G is —O—, —$NR_7$—, —N=N— or —$SO_2$—, $R_3$ and $R_4$ are hydrogen, and $R_7$ is hydrogen, methyl or ethyl.

4. A process according to claim 3, wherein A and B in formula I are each a group of formula

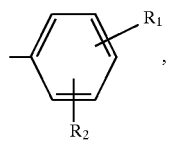

wherein $R_1$ and $R_2$ are each independently of the other hydrogen, methyl, tert-butyl, chloro, bromo, phenyl or CN.

5. A process according to claim 4, wherein $R_2$ in formula I is hydrogen.

6. A process according to claim 2, wherein the two different components of formula I are in the molar ratio from 50–95% to 50–5%.

7. A process according to claim 1, which process comprises dispersing two different compounds of formula I together with a polymer in an extruder in the temperature range from 160° to 210° C. and then moulding them to mouldings in the temperature range from 220° to 300° C.

8. A process according to claim 7, wherein A and B in formula I are each independently of the other a group of formula

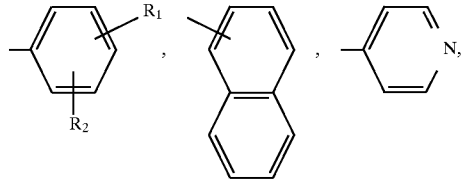

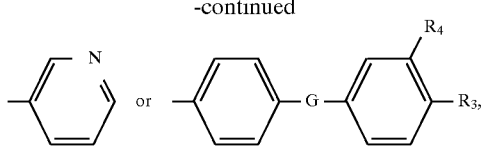

wherein
  $R_1$ and $R_2$ are each independently of the other hydrogen, chloro, bromo, $C_1$–$C_4$alkyl, $C_1$–$C_6$alkoxy, $C_1$–$C_6$alkylamino, phenyl or CN,
  G is —O—, —NR$_7$—, —N=N— or —SO$_2$—,
  $R_3$ and $R_4$ are hydrogen, and $R_7$ is hydrogen, methyl or ethyl.

9. A process according to claim 8, wherein A and B in formula I are each a group of formula

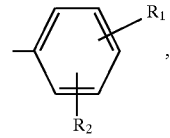

wherein $R_1$ and $R_2$ are each independently of the other hydrogen, methyl, tert-butyl, chloro, bromo, phenyl or CN.

10. A process according to claim 9, wherein $R_2$ in formula I is hydrogen.

11. A process according to claim 7, wherein the two different components of formula I are in the molar ratio from 50–95% to 50–5%.

* * * * *